Dec. 28, 1954  L. S. BIELINSKI  2,698,431
TYPHOON HOMER
Filed Jan. 30, 1951  2 Sheets-Sheet 1
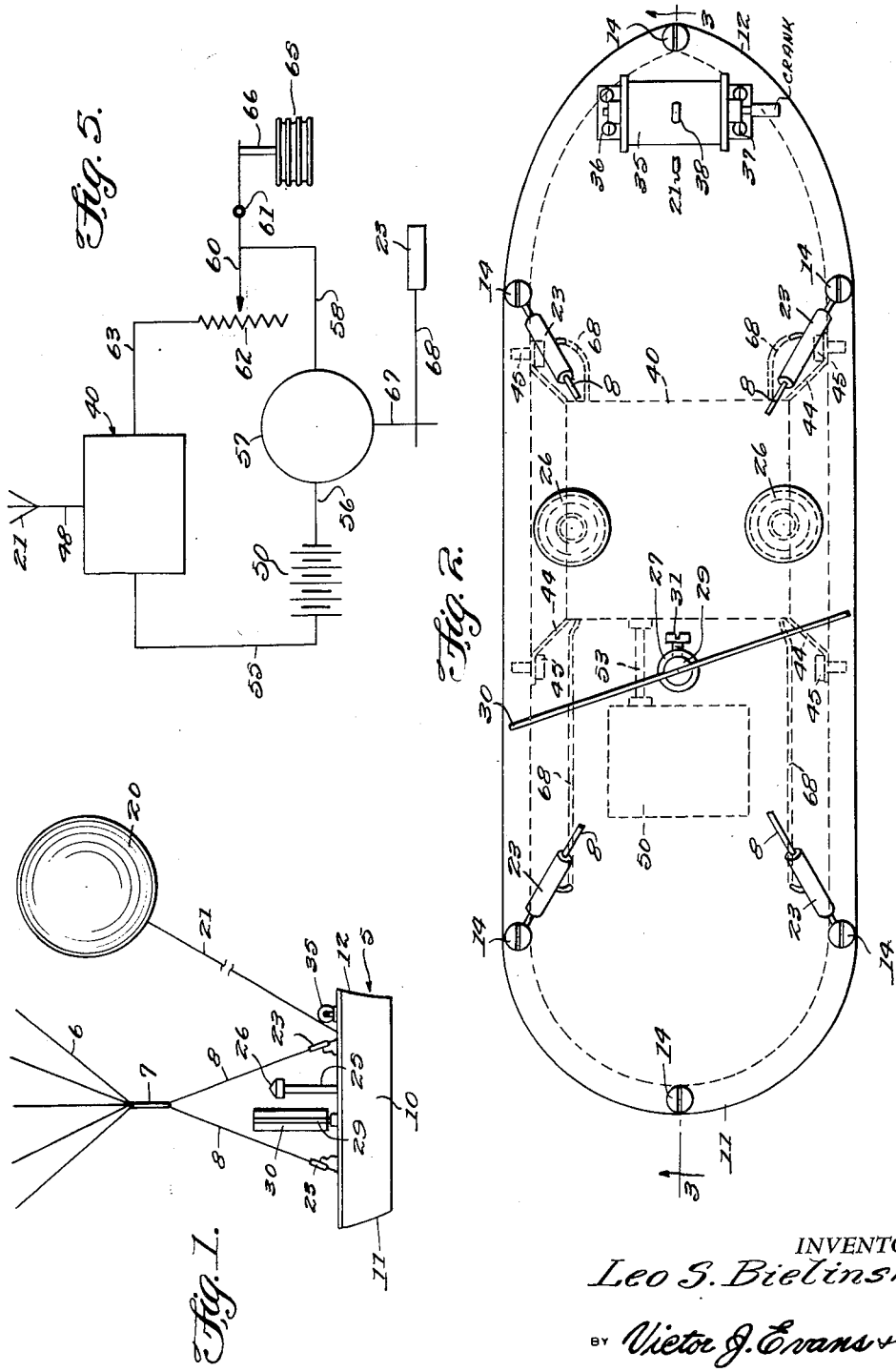
INVENTOR.
Leo S. Bielinski,
BY Victor J. Evans + Leo.
ATTORNEYS

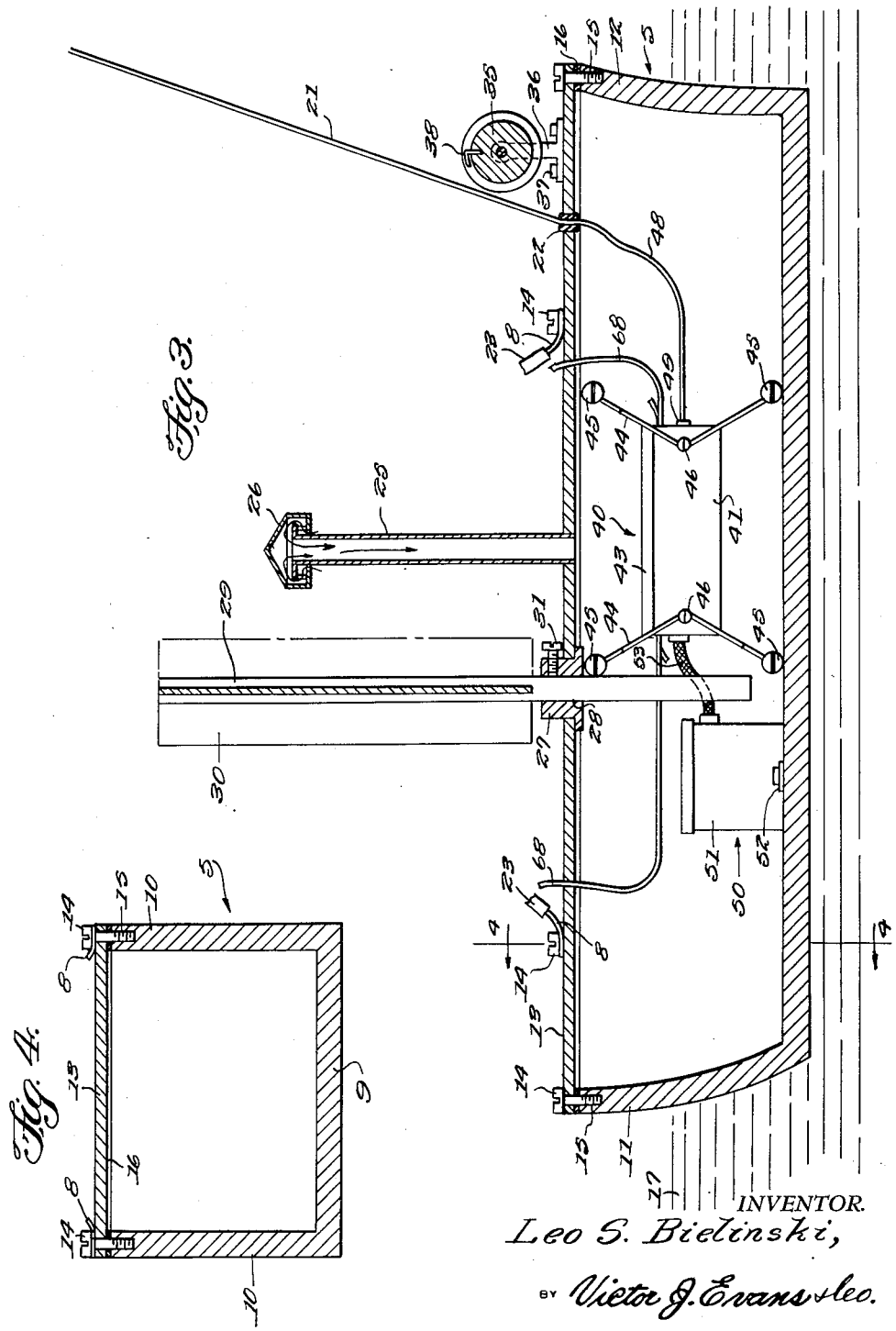

2,698,431

TYPHOON HOMER

Leo S. Bielinski, Mingus, Tex.

Application January 30, 1951, Serial No. 208,635

1 Claim. (Cl. 340—345)

---

The present invention relates to a typhoon homer, and more particularly, to a device to enable the path of a typhoon to be followed and the intensity thereof indicated at remote locations or stations.

One object of the invention is to provide a device for enabling the path of a typhoon to be followed at a remote location, which will eliminate the risk and expense of reconnaissance aircraft now generally used to obtain data concerning the directional path of typhoons and the like.

Another object is to provide a device for obtaining meteorological information which can be conveniently and quickly dropped from an aircraft in the center of a typhoon or storm so that the device will transmit radiant energy from the eye of the storm and enable an accurate fix on the center or eye of the storm at all times.

Another object is to provide a device which will give reliable meteorological data on various conditions of typhoon storms and the like such as an indication of the barometric pressure at the center of the storm continuously.

Another object is to provide a meteorological device which will enable forecasters of weather conditions to make better forecasts of the intensity and future movement of typhoons by utilizing information received at a remote point by the device.

Another object is to provide a meteorological device which can be dropped in the center of a storm from an airplane or the like and which will transmit radiant energy signals when the device strikes the water so that the signals may be received at a remote station and transcribed into data concerning the intensity and path of the storm or typhoon.

Another object is to provide a typhoon homer which will follow the path of the storm from the center or eye and will travel along in the center of the storm so that the intermittent signals transmitted will always be from a location at the center of the storm, whereby a fix on said signals at a remote location will designate the eventual pathway of the storm.

Another object is to provide a device of the above mentioned type in which the intermittent signals are timed to provide a definite beat, and the frequency of the signals is controlled by the barometric pressure conditions of the storm. Thus, as the barometric pressure increases the frequency of the signals will increase correspondingly in amplitude.

Another object is to provide a meteorological device which can be dropped in the eye of a storm over water from an airplane which is provided with a captive balloon such that it will have a tendency to seek the center of the whirl of the storm, and since the direction of the storm is counter-clockwise a sail is provided on the device which will continuously urge the device toward the center or eye of the storm. Thus, the device will be maintained in position close to or adjacent to the storm center in such a manner that the radiant signals emitted will be broadcast from the storm center throughout its entire path.

Other objects and advantages of the invention will become apparent during the course of the following description of the accompanying drawings wherein:

Figure 1 is a side elevational view of the typhoon homer or meteorological device showing the manner in which the same is suspended from a parachute when the device is dropped from an aircraft in the center of a storm.

Figure 2 is a top elevational view illustrating the general shape of the device hull and showing the fixed sail for propelling the device toward the center of the storm throughout the storm pathway.

Figure 3 is a longitudinal cross-sectional view taken on line 3—3 of Figure 2 and looking in the direction of the arrows to illustrate various structural details of the hull and showing the arrangement of the radiant energy transmitter and timer as well as its electrical energy source.

Figure 4 is a vertical cross-sectional view taken on line 4—4 of Figure 3 and looking in the direction of the arrows to illustrate the sectional shape of the hull of the device and the manner in which the deck cover is sealed in place, and Figure 5 is a diagrammatic view of the various control devices for initially releasing the parachute and thereafter transmitting intermittent radiant energy signals, the frequency of which is controlled by barometric pressure responsive mechanism.

In the drawings, wherein for the purpose of convenience of illustration, attention is directed first to Figure 1 wherein the typhoon homer is generally indicated by the reference character 5 which when dropped from an aircraft is suspended from a parachute (not shown) having shrouds 6, the lower ends of which are connected to a terminal 7 having suspension ropes 8. When the device is dropped from an aircraft the parachute (not shown) opens in the usual way and retards the descent of the typhoon homer or meteorological device 5.

The device 5 comprises a hull structure including a flat bottom 9 having sides 10 which are connected at the rear by a stern 11 and at the front by a prow 12. The hull structure 5 of the device is hollow and is provided with a deck 13 which is secured to the sides, stern and prow by machine screws 14 which are received in correspondingly threaded internal bores 15. A sealing strip 16 is interposed between the hull 5 and deck 13 to exclude moisture and prevent water from entering the hull when the device is dropped in a body of water 17 such as an ocean or the like, in which a typhoon or other storm is present. It is intended to drop the meteorological device or typhoon homer over a body of water such as an ocean or the like from an aircraft as the same approaches or enters the center of a typhoon or similar storm.

A captive balloon 20 is provided for a purpose which will be hereinafter more fully described, and is connected to the deck 13 of the typhoon homer by an electrical cable 21 which is employed as an antenna for the radiant energy transmitter and in addition holds the meteorological device 5 in the center of the storm by reason of the fact that it is filled with a gas lighter than air, and is moved toward the center of the storm by a centripetal force. The antenna cable 21 is secured to the deck 13 by means of a clamping bushing 22 and extends through the bushing into the hull 5. The lower ends of the suspension cables 8 of the shrouds 6 are connected to the machine screws 14 and interposed in said suspension cables are disruptive sleeves 23 having an explosive charge which is adapted to be ignited from the electrical energy source when the initial radiant energy signal is transmitted. The explosion charge in the disruptive devices 23 causes the cables 8 to become detached from the hull 5 in order to free the parachute after the hull descends into the water and floats on the surface thereof.

A vent tube 25 has its lower end mounted in the deck 13 and its upper end provided with a vent cap 26 to permit air passage to the interior of the hull as indicated by the arrows in Figure 3. Mounted rearward of the ventilator tube 25 is a collar 27 which is secured in the deck 13, and said collar is provided with a central opening 28 for receiving a mast 29 on which is mounted a fixed sail 30 formed of rigid material. A set screw 31 is mounted in the collar 27 to hold the mast 29 in place and permit the same to be adjusted to predetermined angular positions. Normally, the sail 30 is placed at an angle of approximately 30 degrees across a line of equal pressure (isobar) with relation to the storm center. Thus, since the storm whirl is counter-clockwise the resultant force of the storm whirl will propel the hull of the device in a direction toward the storm center constantly throughout its change in angular position.

The antenna cable 21 is adapted to be wound on a reel 35 mounted on a reel bracket 36 secured to the deck 13 by bolts or machine screws 37. The reel 35 is provided with a hook 38 to which is adapted to be temporarily attached the antenna cable 21 at a point intermediate its ends so that the captive balloon 20 may be held close to the deck 13 when being transported to the desired storm area in the aircraft. Suitable latching means may be provided for the reel 35 which can be released when the meteorological device is released from the aircraft so that the balloon 20 during the descent of the device will be projected by reason of the uncoiling of the antenna cable 21.

The radiant energy transmission device and control mechanism is generally indicated as at 40 and includes a casing 41 having a removable cover 43 (Fig. 3). The casing 41 is floatingly mounted within the hull 5 to absorb shocks and is suspended from elastic cables 44 connected to the side walls 10 of the hull at the top and bottom as at 45. The intermediate portions of the elastic cables 44 are attached to the casing 41 by suitable fastening elements 46. The antenna lead-in 48 is connected to the antenna cable 21 and enters the transmission and timer casing 41 as at 49. Also mounted in the hull 5 is a direct current source 50 which includes a casing 51 affixed to the bottom wall of the hull by screws or the like 52.

A waterproof sheathed cable 53 extends between the battery casing 51 and the transmission and timer casing 41 to prevent short circuiting of the supply cable should the same become damp or moist from weather conditions.

Attention is directed to Figure 5 wherein there is shown diagrammatically the radiant energy transmitter and the various controls thereof and in circuit therewith. The radiant energy transmitter 40 includes a conventional radio-frequency oscillator to generate a frequency carrier wave, and the oscillator includes conventional inductance and capacitators which are inductively coupled to the antenna circuit and to the antenna 21 by the lead-in cable 48. The source of electrical energy 50 may include a storage battery of approximately 12 volts which is connected to the vibrator and step-up transformer (not shown) in the transmitter casing 40 to supply the plate circuit with a stepped-up direct current source of approximately 300 volts. The vibrator being of conventional type and provided with multiple contacts is connected to the transformer to rectify the alternating current from the transformer. Such vibrator and step-up transformer units are of conventional design and are provided for mobile communication units for providing the plate circuit of a transmitter or the like with a stepped-up voltage from a low voltage direct current source. As shown in Figure 5, the battery 50 is connected to the vibrator by a cable 55 and the other terminal of the battery is connected by a cable 56 to a timer 57. The timer 57 is adapted to periodically make and break the circuit through the radio-frequency oscillator and includes a clock train mechanism for operating a cam controlled switch. The movable contact of the switch is connected to a cable 58 which is attached to the terminal 59 of an adjustable resistor blade 60 pivoted as at 61 and having one of its ends in contactual engagement with a resistor winding 62. One terminal of the resistance winding being connected to the inductance in the radio-frequency oscillator (not shown) by an electrical connection 63. Thus, the amplitude of the frequency of the radio-frequency transmitter will vary according to variations in the movement of the resistor blade, and when the resistance in the radio-frequency oscillator circuit is varied.

In order to operate the resistor blade 60 a barograph 65 of the sylphon type has its control shaft 66 in engagement with the outer end of the resistor blade 60. Thus, changes in atmospheric pressure existing in the center of the storm area will shift the resistor blade 60 and change the resistance in the radio frequency oscillator circuit and produce radiant energy signals at various amplitudes.

The timer 57 is provided with a cable 67 which is attached to the switch arm of the circuit maker and breaker, and said cable is electrically connected to the disruptive devices 23 by means of a cable 68 to ignite a small explosive charge in the disruptive device and thus free the suspension cables 8 and the parachute from the hull 5. The arrangement is such that on the first or initial circuit closing position of the timer 57 the explosive charge in each of the disruptive devices 23 will be set off simultaneously.

The filament circuit (not shown) for the radio-frequency oscillator tubes is supplied from the low voltage energy source 50 in the conventional manner.

In operation, the hull 5 with the parachute (not shown) and balloon attached is dropped or released from an aircraft over a body of water close to the center of a typhoon or storm area. When the hull 5 lands in the body of water the captive balloon 20 is projected from its retracted position by reason of the fact that it unwinds from the drum 35 during descent. Upon the first or initial closing of the periodic switch governed by the timer 57, the explosive charges in the disruptive devices 23 are ignited to release the parachute. Simultaneously, the first radiant energy signal will be transmitted due to the closing of the circuit through the cables 55 and 63 to the radio-frequency oscillator 40. This signal is received at one or more weather bureau stations to enable a fix to be obtained upon the pathway of the storm. The land stations may employ an oscillograph to determine the amplitude of the frequency of the oscillations depending upon the barometric pressure in the storm area as previously described.

The balloon 20 and sail 30 maintain the hull 5 in the storm center and thus, radiant energy signals transmitted periodically will enable the land station to obtain a fix on the device and thus obtain accurate data as to the longitude and latitude of the storm and its pathway direction. It will thus be seen that the hull of the typhoon homer will follow the storm center throughout its movement in any direction and will periodically transmit radiant energy signals during the storm movement so that an accurate fix can be obtained which will give the exact location and the direction of the storm pathway.

I claim:

A device for indicating the path of a typhoon, comprising a hollow hull including a bottom, sides, a stern and a prow, a deck secured to said hull, an electrical cable having its lower end secured to said deck and providing an antenna, a captive balloon connected to the upper end of said cable, securing elements extending upwardly from said deck, parachute suspension cables connected to said securing elements, disruptive sleeves interposed in said suspension cables, a mast extending upwardly from said deck, a fixed sail secured to said mast, a radiant energy transmission device and control mechanism comprising a casing floatingly mounted in said hull and having said antenna cable connected thereto, a current source positioned in said hull and electrically connected to said casing, a radio-frequency oscillator positioned in said casing, a variable resistor connected to said oscillator, and a barograph for varying said resistor.

References Cited in the file of this patent

UNITED STATES PATENTS

| Number | Name | Date |
|---|---|---|
| 445,609 | Riley | Feb. 3, 1891 |
| 1,683,409 | Picco | Sept. 4, 1928 |
| 2,118,603 | Hailey | May 24, 1938 |
| 2,312,567 | Lyon | Mar. 2, 1943 |
| 2,367,160 | Wallace | Apr. 18, 1944 |
| 2,384,721 | Bingham | Sept. 11, 1945 |
| 2,398,744 | Jalbert | Apr. 16, 1946 |
| 2,441,133 | Brady | May 11, 1948 |
| 2,470,783 | Mead | May 24, 1949 |

FOREIGN PATENTS

| Number | Country | Date |
|---|---|---|
| 11,019 | Great Britain | May 11, 1907 |